US007637422B2

(12) United States Patent
Kwak et al.

(10) Patent No.: US 7,637,422 B2
(45) **Date of Patent: *Dec. 29, 2009**

(54) AUTOMATED TELLER MACHINE CAPABLE OF DEPOSITING CHEQUES

(75) Inventors: Jae Hoon Kwak, Gyeonggi-do (KR); Woo Ho Lee, Seoul (KR); Hee Chang Lee, Gyeonggi-do (KR); Jae Hun Yi, Gyeonggi-do (KR); In Gyu Roh, Gyeonggi-do (KR); Jong Seok Lee, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 567 days.

This patent is subject to a terminal disclaimer.

(21) Appl. No.: 11/475,138

(22) Filed: Jun. 27, 2006

(65) Prior Publication Data

US 2007/0164097 A1 Jul. 19, 2007

(30) Foreign Application Priority Data

Jan. 16, 2006 (KR) ...................... 10-2006-0004302
Feb. 3, 2006 (KR) ...................... 10-2006-0010399

(51) Int. Cl.
*G06F 17/60* (2006.01)

(52) U.S. Cl. .......................... 235/379; 235/381; 705/14

(58) Field of Classification Search ................. 235/379, 235/381; 705/14
See application file for complete search history.

(56) References Cited

U.S. PATENT DOCUMENTS

2007/0215692 A1* 9/2007 VanKirk et al. ............. 235/379

* cited by examiner

*Primary Examiner*—Allyson N Trail
(74) *Attorney, Agent, or Firm*—Fenwick & West LLP

(57) ABSTRACT

A automated teller machine (ATM) verifies the authenticity of the cheque based on image information acquired by a CIS unit and magnetic character information acquired by a MICR unit. The ATM further includes a plural cheque leaves determining unit for determining the presence of plural cheque leaves using the image information, the magnetic character information, and thickness information of the cheque.

8 Claims, 4 Drawing Sheets

AUTOMATED TELLER MACHINE CAPABLE OF DEPOSITING CHEQUES

FIELD OF THE INVENTION

The present invention relates to an automated teller machine (ATM) and, more particularly, to an ATM capable of performing a cheque-depositing transaction and capable of reliably detecting the presence of plural cheque leaves.

BACKGROUND OF THE INVENTION

As one example of automatic banking equipments, an automated teller machine (ATM) enables a user to enjoy various banking services, such as depositing and drawing, offered by banks or credit card companies, without resort to the intervention of a clerk. As the user inserts a bankbook or a credit card into the ATM through an insertion slot, the ATM helps the user to do banking transactions by identifying the user based on information stored in the bankbook or the credit card and displaying a guide note on a display screen. The details of the banking transactions rendered in the ATM are stored in a storage memory of the ATM and, at the same time, are printed on the bankbook and a transaction slip which is to be presented for the user. Cashes or banknotes are then dispensed to the user by the ATM, thus completing the banking transactions.

A large number of cheques are received at a bank window when customers make payment or remittance using the cheques instead of cash. On this occasion, the clerk at the bank window verifies the cheques received from the customers and endorses on the back side of the cheques for official receipt in the case that the verification reveals no abnormality. Each and every cheque thus received is scanned by a scanner to store the image of the cheques in preparation for later information reference.

Such a cheque receiving task is manually conducted by the clerk, which may pose a variety of problems, including errors possibly caused by the manual works, delay in dealing with the duties, reduction in working efficiency and demand for increased manpower. In addition, the manual cheque receiving operation involves a prolonged waiting time from the view point of customers and hence makes the customers feel time-consuming and inconvenient.

In order to achieve a cheque-depositing capability, there has been proposed a side-car module wherein a separate cheque-depositing module is installed immediately next to the ATM side-by-side. However, such a side-car module has a drawback in that an additional space is further required to install it next to the ATM.

On the other hand, U.S. Pat. No. 6,978,927 discloses apparatus and methods of reviewing deposited cheques wherein a user inserts a card into a card reader slot of a cheque-depositing ATM. A cheque to be deposited is then inserted into a cheque input/output slot, after which the amount to be deposited is entered. A cheque transportation mechanism receives the cheque and conveys it along a cheque moving path for subsequent processing. The cheque is imaged and verified through communication with a remote bank facility. If the cheque is determined to be unacceptable, it is returned back to the user through the cheque input/output slot. However, if the cheque is acceptable, the amount of the cheque is deposited into the user's account and the cheque is conveyed to and stored at a storage bin, at which time a printer makes endorsement on the cheque.

In such a cheque-depositing ATM referred to above, the depositing transaction has to be performed on a single cheque leaf basis. In a hypothetical case where two or more cheque leaves are overlapped one above another as they are inserted into the ATM, accurate information can be acquired for one cheque leaf exposed to the outside, but the remaining cheque leaf or leaves is kept concealed and therefore cannot be processed accurately. To avoid such an instance, the presence of plural cheque leaves should be detected in the cheque-depositing process so that the depositing transaction can be performed only for a single cheque leaf with the remaining ones returned to the user.

For the reasons stated above, a strong demand has existed for a means capable of accurately and reliably detect the presence of plural cheque leaves in the cheque-depositing ATM.

SUMMARY OF THE INVENTION

It is, therefore, an object of the present invention to provide an ATM capable of performing a cheque-depositing transaction in an automated manner.

Another object of the present invention is to provide a ATM capable of accurately and reliably detecting the presence of plural cheque leaves deposited therein.

According to an aspect of the present invention, there is provided to an automated teller machine (ATM), which includes: a cheque input slot through which the cheque is inserted on a leaf-by-leaf basis; a transportation unit for transporting the cheque along a cheque moving path; a CIS (Contact Image Sensor) unit for scanning the cheque to acquire image information; a MICR (Magnetic Ink Character Recognition) unit for acquiring information on magnetic characters printed on the cheque; a printing unit for printing endorsement characters on the cheque; and means for verifying the authenticity of the cheque based on the image information acquired by the CIS unit and the magnetic character information acquired by the MICR unit and for returning the cheque or allowing the cheque to be endorsed and stored, depending on the result of verification.

According to another aspect of the present invention, there is provided to an automated teller machine (ATM) capable of depositing a cheque, which includes: a cheque input slot through which a cheque is inserted on a leaf-by-leaf basis; a transportation unit for transporting the cheque along a cheque moving path; a CIS (Contact Image Sensor) unit for scanning the cheque to acquire image information; a MICR (Magnetic Ink Character Recognition) unit for scanning the cheque to acquire magnetic information; a plural cheque leaves detecting unit for sensing the thickness of the check; and means for determining the presence of plural cheque leaves using the image information, the magnetic character information and thickness information of the cheque; a printing unit for printing endorsement characters on the cheque supplied from the plural cheque leaves detecting unit; and means for verifying the authenticity of the cheque based on the image information acquired by the CIS unit and the magnetic character information acquired by the MICR unit and for returning the cheque or allowing the cheque to be endorsed and stored, depending on the result of verification.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 1:
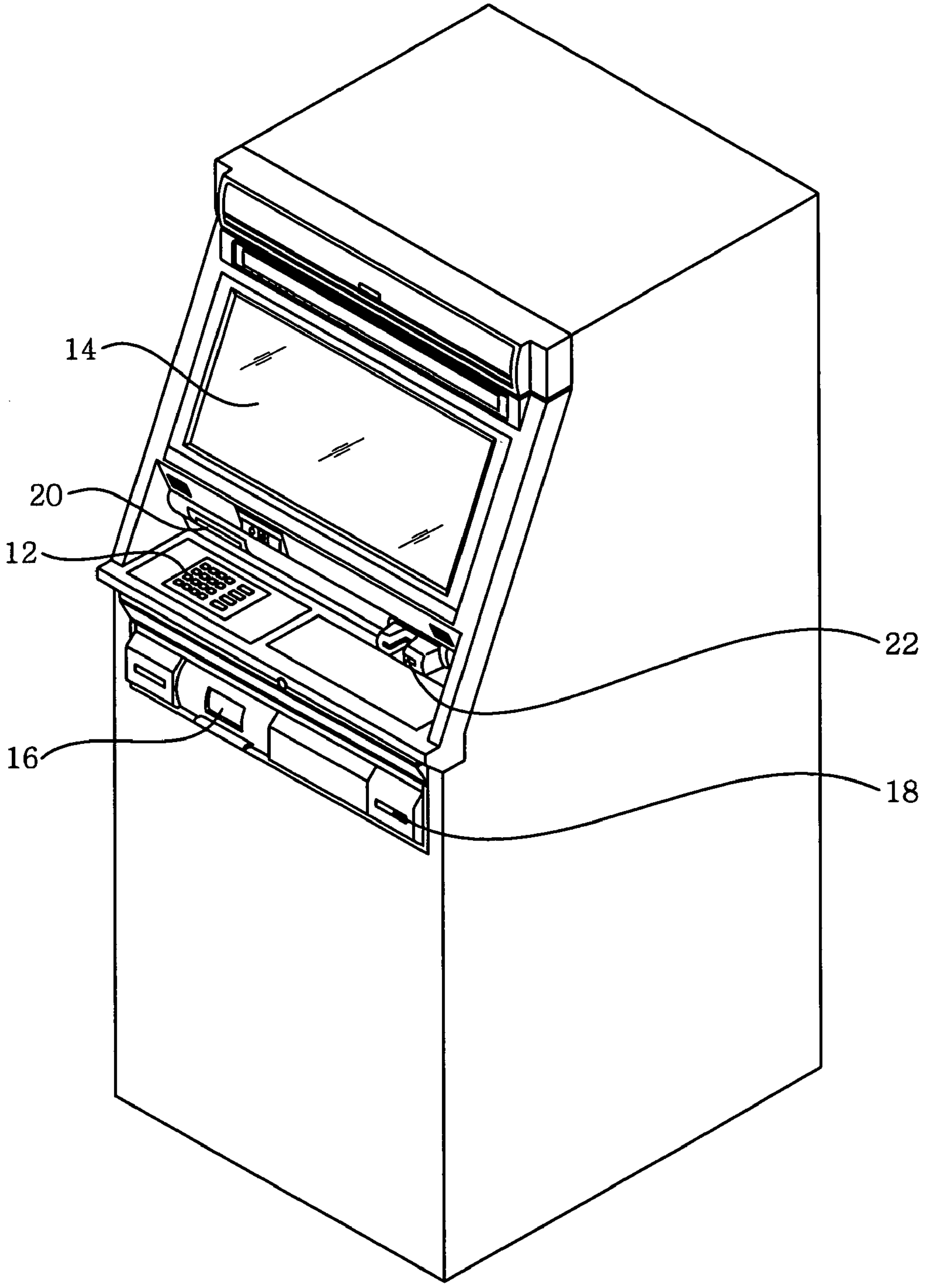
FIG. 1 is a pictorial view schematically showing the external appearance of an ATM in accordance with the present invention.

FIG. 1 is a pictorial view schematically showing the external appearance of an ATM capable of depositing cheques in accordance with the present invention. As shown, the ATM includes a key pad 12 comprised of a plurality of operational and numeric keys, a display 14 for displaying the information inputted through the key pad 12 and the information processed in the ATM, banknote and cheque input/output openings 16 and 18 for allowing a user to enter and take out banknotes and cheques therethrough, and bankbook and card input/output slots 20 and 22 through which a bankbook and a credit card are inserted and returned.

The ATM further includes a cheque-depositing module 100 (see FIGS. 2A and 2B) communicatably associated with the remote host computer (not shown). The cheque-depositing module 100 serves to send a variety of information on the cheque acquired by itself to the host computer. In compliance with the commands received from the host computer, the cheque-depositing module 100 verifies the authenticity of the cheque inputted and deposits the cheque if the cheque reveals no abnormality. More specifically, the cheque inputted by the user is transported forward by means of a transportation mechanism (not shown), during which the information on the cheque is acquired by scanning or other methods. Based on the information thus acquired, verification is made regarding the authenticity of the cheque. If the cheque is determined to be acceptable, it is subjected to depositing process. As the cheque is conveyed through the transportation mechanism, a printer (not shown) makes endorsement on the cheque. If, however, the cheque reveals any abnormality, it is returned to the user.

Although not shown in this drawing, the ATM further includes a cash processing module communicatably associated with a remote host computer (not shown) in the same manner as the cash input/output module does. Although not shown in this drawing, the communication controller may be constructed for common or dedicated use by the cash input/output module and the cheque-depositing module 100. While communicating with the remote host computer, the cash processing module refers to the host computer for user's identification, based on the information stored in the bankbook or the credit card, and records the details of depositing or drawing transaction on the bankbook or the credit card. After that, the bankbook or the credit card having the details recorded thereon is returned to the user.

Figure 2A:
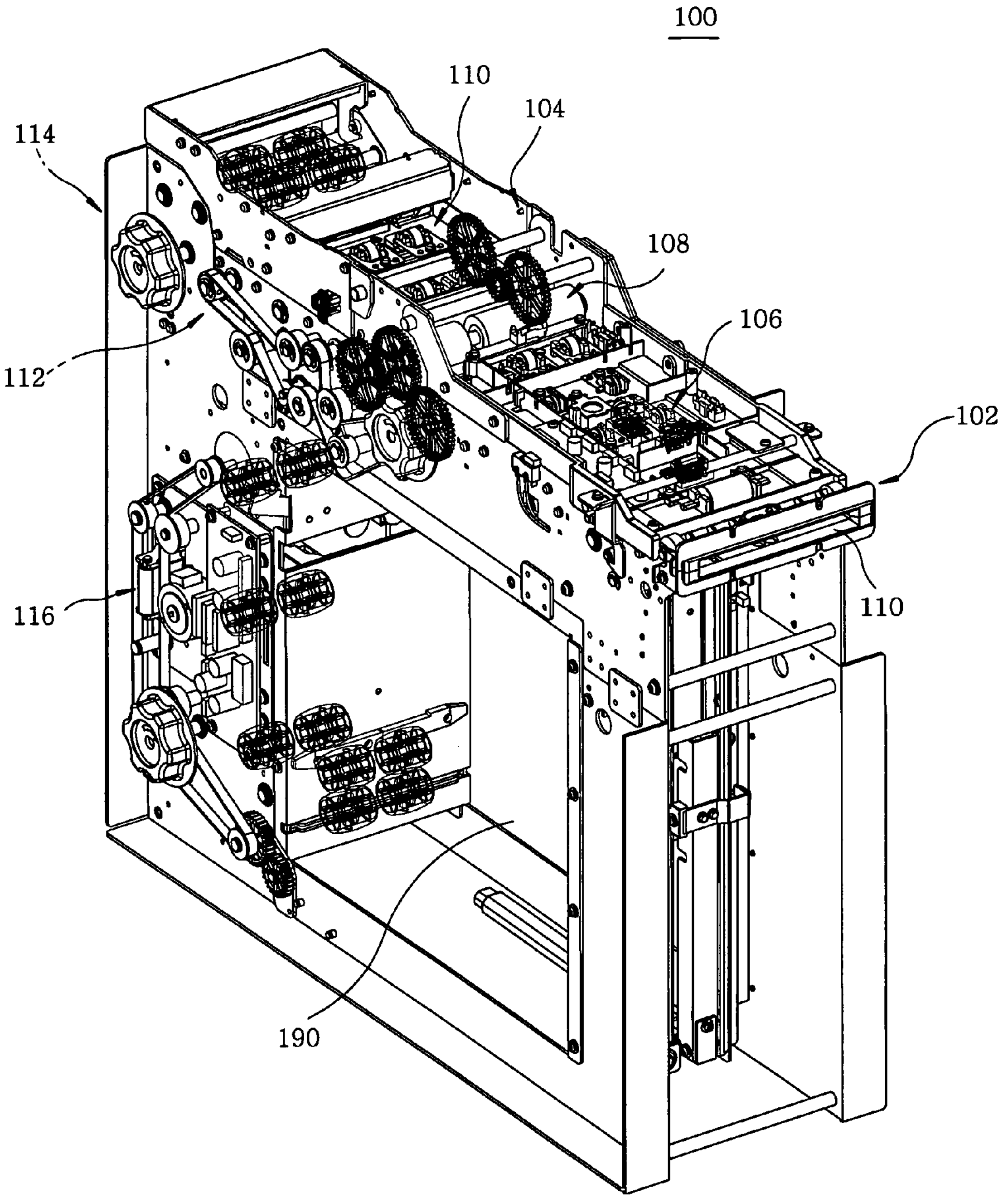
FIGS. 2A and 2B illustrate a perspective view and a schematic block diagram of the cheque-depositing module employed in the ATM shown in FIG. 1, respectively.
Figure 2B:
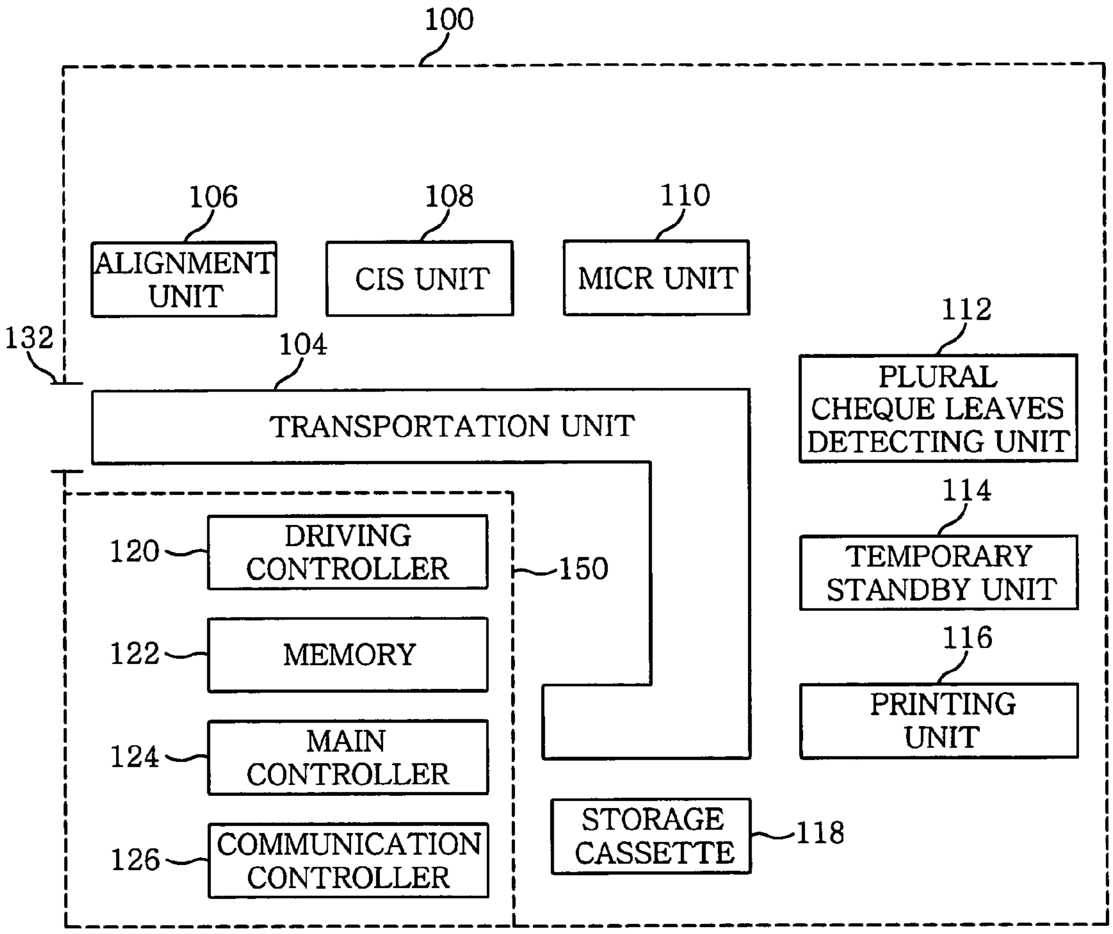

Referring to FIGS. 2A and 2B, there are illustrated a perspective view and a schematic block diagram of the cheque-depositing module employed in the ATM shown in FIG. 1, respectively.

The cheque-depositing module 100 includes a cheque input unit 102 through which the user inserts the cheque on a leaf-by-leaf basis, a transportation unit 104 for conveying the cheque along a cheque moving path, an alignment unit 106 provided in the cheque moving path 321 for aligning the cheque on the cheque moving path, a CIS (Contact Image Sensor) unit 108 provided in the cheque moving path for scanning the cheque to acquire an image containing the information on the cheque, an MICR (Magnetic Ink Character Recognition) unit 110 provided in the cheque moving path for reading out magnetic characters printed on the cheque to acquire the information carried by the magnetic characters, a plural cheque leaves detecting unit 112 provided in the cheque moving path for detecting the presence of two or more overlapped cheque leaves, a printing unit 116 provided in the cheque moving path for printing endorsement characters on the cheque in response to printing instructions, a temporary standby unit 114 disposed integrally with the cheque moving path between the MICR unit 110 and the endorsement character printing unit 116 for allowing the cheque to stop and temporarily stand by, and a storage cassette 118 for receiving and storing the endorsed cheque.

The cheque-depositing module 100 further includes a cheque-depositing processing unit 150 that plays a role of a software processing. The cheque-depositing processing unit 150 controls overall operation of the cheque-depositing module 100, which will then be described hereinafter.

The cheque input unit 102 is a scheme through which the cheque is inputted on a leaf-by-leaf basis from the cheque input/output opening 18 by the customers or the bank clerks and returned to them. The cheque input unit 102 includes: a cheque input slot 132; a shutter (not shown) provided inside the cheque input slot 132 and adapted to be opened or closed to control movement of the cheque; and a cheque input detector (not shown) for sensing the cheque inputted from the outside to open the shutter. In this regard, the shutter is opened only at the moment when the cheque is inputted or returned and normally kept closed to ensure that a further cheque is prevented from inputting in the course of processing the previously inputted cheque.

The transportation unit 104 extends from the cheque input/output unit 102 to the storage cassette 118 and provides the cheque moving path.

The alignment unit 106 serves to align the cheque on one side of the cheque moving path while the cheque inputted moves along a predetermined interval of the cheque moving path. The reason for aligning the cheque is to make sure that the cheque can be processed at an accurate position in the CIS unit 108 and the MICR unit 110. The alignment unit 106 may be comprised of a plurality of aligning rollers (not shown) whose axes of rotation are perpendicular to the direction of movement of the cheque.

The CIS unit 108 serves to continuously scan the cheque to acquire image information on the cheque as the cheque moves forward from the alignment unit 106. The CIS unit 108 is adapted to acquire the image information from the opposite surfaces of the cheque. Thus, the CIS unit 108 takes image data of the cheque in the first place and then recognizes the cheque information from the image data, thereby acquiring a variety of information on the size, external appearance and amount of the cheque.

The MICR unit 110 serves to additionally acquire cheque information from magnetic characters printed on the cheque as the cheque moves forward from the CIS unit 108. Typically, the cheque contains issuance information, such as a serial number, an account number and the name of bank, at certain positions in the form of magnetic characters. The MICR unit 110 acquires such magnetic character information on the cheque through the use of a magnetic recognition head (not shown).

The plural cheque leaves detecting unit 112 serves to detect the presence of two or more overlapped cheque leaves by sensing the thickness of the cheques as the cheque moves forward from the CIS unit 108 and/or the MICR unit 110. In a hypothetical case where two or more overlapped cheque leaves are inadvertently inputted and moved along the cheque moving path, the tasks of acquiring cheque information and printing on the cheque are performed with respect to one cheque and hence no processing is conducted for the remaining cheque or cheques. The reason for executing the detection of plural cheque leaves is to avoid any occurrence of such an unwanted situation.

Under the control of the cheque-depositing processing unit 150, the printing unit 116 executes printing of characters for final endorsement indicative of the transfer of rights of the cheque. The endorsement printing is executed only if the cheque is determined to be acceptable in view of the information acquired in the CIS unit 108 and the MICR unit 110 and if the plural cheque leaves detecting unit 112 fails to notice the presence of plural cheque leaves. The endorsement means that the rights relating to the cheque are transferred from the customers to the bank. Examples of items endorsed include a depositing date, a depositing amount and bank information.

The temporary standby unit 114 is integrally formed with the cheque moving path between the MICR unit 110 and the printing unit 116 and allows the cheque to temporarily stand by at a front thereof. In other words, prior to the cheque being subjected to the endorsement, the cheque is controlled to stand by at the temporary standby unit 114 until final depositing instructions are issued from the cheque-depositing processing unit 150. Responsive to the depositing instructions, the cheque is fed to the printing unit 116. If a depositing cancellation instruction is issued, the cheque is returned from the temporary standby unit 114 to the outside by the reverse actuation of the transportation unit 104.

The storage cassette 118 has a bin-like closed receiving space in which the endorsed cheque is finally stored.

As set forth above, the cheque-depositing processing unit 150 plays a role of software processing in the cheque-depositing module 100 and may be implemented with a microcomputer or a microprocessor. The cheque-depositing processing unit 150 is comprised of the memory 122, the driving controller 120, the main controller 124 and the communication controller 126.

The memory 122 is used for storing the various cheque information acquired by the CIS unit 108 and the MICR unit 110 and a variety of software executable by the main controller 124.

The driving controller 120 functions to control the overall operation of the cheque-depositing module 100 under the control of the main controller 124. The operation controlled by the driving controller 120 includes cheque transportation, alignment, scanning, magnetic character recognition, plural cheque leaves detection and endorsement printing.

The communication controller 126 is a communication interface for making communication with the remote host computer. The communication controller 126 is comprised of a transmitting means for sending the cheque information previously acquired to the host computer and a receiving means for receiving a variety of commands from the host computer.

The main controller 124 serves to perform a centralized control by executing the software stored in the memory 122 and also perform a verification of the deposited cheque in response to the commands issued from the host computer.

Figure 3:
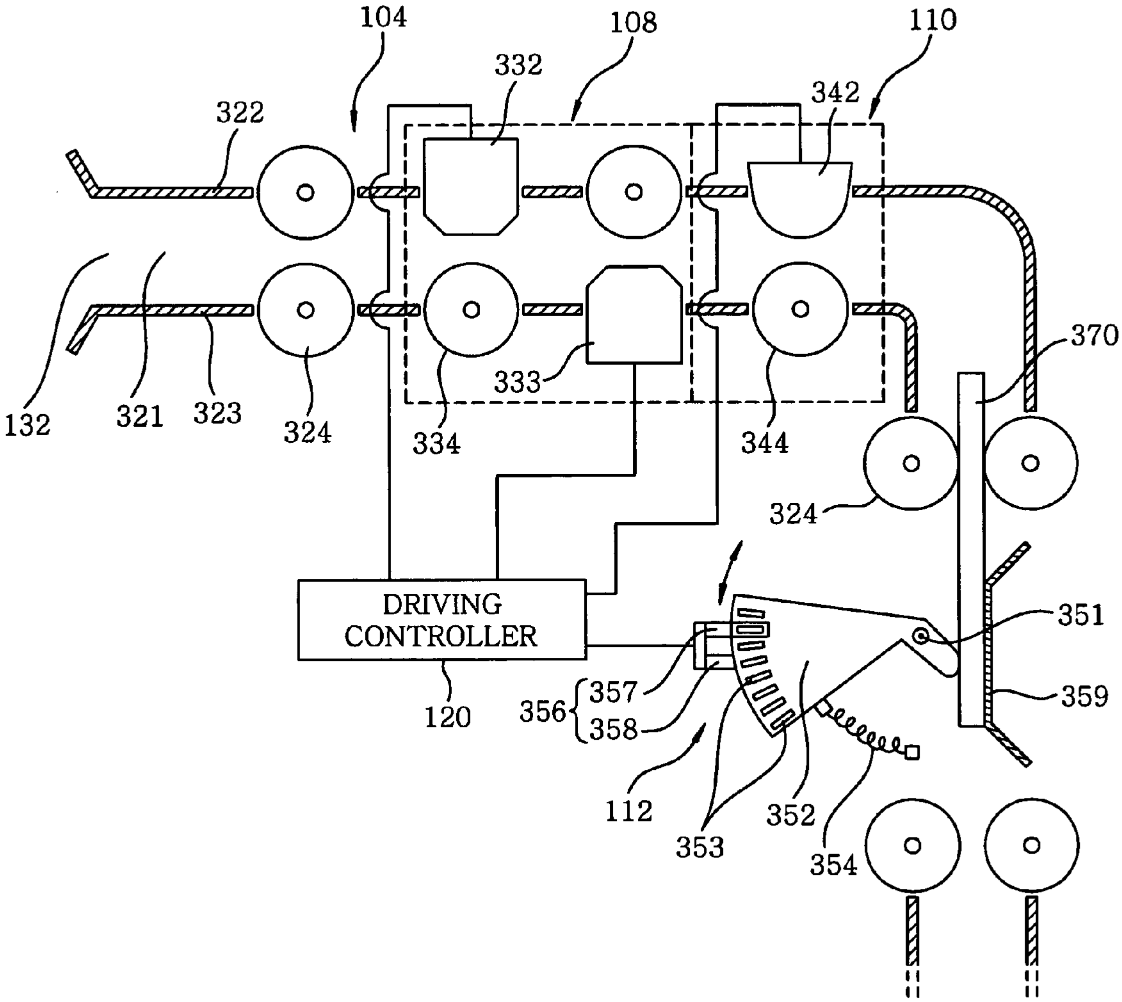
FIG. 3 shows a schematic diagram of a CIS unit, a MICR unit and a plural cheque leaves detecting unit disposed along a transportation unit in the cheque-depositing module illustrated in FIG. 2B.

FIG. 3 is a schematic diagram of the CIS unit 108, the MICR unit 110 and the plural cheque leaves detecting unit 112 disposed along the cheque moving path 321 in the cheque-depositing module 100 illustrated in FIG. 2B.

The transportation unit 104 includes upper and lower guide walls 322 and 323 extending forward from the cheque input slot 132 to define therebetween a cheque moving path 321 along which a cheque 370 is transported, plural pairs of transportation rollers 324 provided along the guide walls 322 and 323 at a predetermined interval for nipping and transporting the cheque 370 along the cheque moving path 321, and a transportation motor (not shown) for applying a driving force to the transportation rollers 324.

The CIS unit 108 includes two scanning heads 332 and 333 for making contact with the front and rear surfaces of the cheque 370 to scan it, two pressing rollers 334 for pressing the cheque 370 against the scanning heads 332 and 333 to assure accurate scanning, and a decipherment means (not shown) for deciphering the image data created by the scanning heads 332 to acquire character and symbol information or other information. The acquired information is then provided to the driving controller 120.

The MICR unit 110 includes a magnetic recognition head 342 and a pressing roller 344 for pressing the cheque 370 against the magnetic recognition head 342 to assure accurate recognition of the magnetic character information. The acquired information is then provided to the driving controller 120.

According to the present invention, the CIS unit 108 and the MICR unit 110 are used in primarily and secondarily detecting the presence of plural cheque leaves. Namely, the presence of plural cheque leaves is determined based on the image information and the magnetic character information acquired by the CIS unit 108 and the MICR unit 110.

More specifically, the presence of plural cheque leaves is primarily detected by finding out the size or the like of the cheque 370 based on the image information acquired by the CIS unit 108. Then, the presence of plural cheque leaves is secondarily detected by discriminating the abnormality of the magnetic character information acquired by the MICR unit 110. Finally, the presence of plural cheque leaves is mechanically detected by the plural cheque leaves detecting unit 112.

The plural cheque leaves detecting unit 112 is comprised of a rotating mechanism provided on the cheque moving path 321 for rotation at different angles depending on the thickness of the cheque 370 or cheques. The presence of plural cheque leaves is detected by sensing the angle of rotation of the rotating mechanism based on a thickness of the cheque 370. More specifically, the plural cheque leaves detecting unit 112 includes a rotating plate member 352 brought into contact with the cheque 370 at its one end and rotatable about a pivot shaft 351 by the pushing force of the cheque 370 into an angular position corresponding to the thickness of the cheque 370. The rotating plate member 352 has a plurality of radially extending slits 353 in the vicinity of the other end. The plural cheque leaves detecting unit 112 further includes a photo sensor 356 for detecting the number of the slits 353 which has moved past the photo sensor 356 by the rotation of the rotating plate member 352 and a spring member 354 for biasing the rotating plate member 352 to come back to its original position after the cheque 370 has passed the rotating plate member 352.

The photo sensor 356 includes a light-emitting part 357 for directing a light toward the slits 353 of the rotating plate member 352 and a light-receiving part 358 provided on the opposite side of the light-emitting part 357 for receiving the light emitted by the light-emitting part 357 to detect the number of the slots 353 of the rotating plate member 352 moved past the photo sensor 356.

Additionally and optionally, the plural cheque leaves detecting unit 112 includes a guide plate 359. The guide plate 259 accurately guides the cheque 370 with respect to the rotating plate member 352, wherein the cheque 370 moves through between rotating plate member 352 and the guide plate 359.

The light-receiving part 358 of the photo sensor 356 is communicated with the driving controller 120 so that, based on the detection result sent from the light-receiving part 358, the plural cheque leaves determination unit 360 can find out the thickness of the cheque 370 or cheques and thus discriminate the presence of plural cheque leaves.

The driving controller 120 is electrically connected to the CIS unit 108, the MICR unit 110 and the plural cheque leaves detecting unit 112 to discriminate and determine the presence of plural cheque leaves based on the information acquired by the CIS unit 108 and the MICR unit 110 and the thickness of the cheque 370. The driving controller 120 acts to ensure that the transportation unit 104 is driven in the reverse direction to return and dispense the cheque 370 if the presence of plural cheque leaves is confirmed from the information acquired by one of the CIS unit 108, the MICR unit 110 and the plural cheque leaves detecting unit 112. In contrast, if two or more cheque leaves are not detected, the transportation unit 104 continues to move the cheque 370 forward for subsequent processing under the control of the driving controller 120.

In this way, according to the present invention, the presence of plural cheque leaves is detected in a tripartite manner by means of the CIS unit 108, the MICR part 110 and the plural cheque leaves detecting unit 112, which enhances accuracy and reliability of the detection. It should be noted that the CIS unit 108, the MICR unit 110 and the plural cheque leaves detecting unit 112 may be arranged in any order along the cheque moving path 321.

Now, description will be given to the overall operation of the cheque-depositing module 100.

First, if the customers or the bank clerks insert a single leaf of cheque into the cheque input unit 102, the transportation unit 104 is driven to transport the cheque 370 along the cheque moving path 321.

Then, the cheque 370 is aligned on one side while passing through the alignment unit 106 and reaches the CIS unit 108 where the image information is acquired from the opposite surfaces of the cheque 370.

The cheque 370 continues to move forward and reaches the MICR unit 110 where the magnetic character information is acquired from the cheque 370.

Thereafter, the cheque 370 passes through the CIS unit 108, the MICR unit 110 and the plural cheque leaves detecting unit 112 where the presence of plural cheque leaves is discriminated. Thereafter, the cheque stops and temporarily stays at the temporary standby unit 114.

In the meantime, the cheque information, such as the image information and the magnetic character information, acquired by the CIS unit 108 and the MICR unit 110 is stored in the memory 122 and also transferred via the communication controller 126 to the host computer for the verification of the cheque.

If the command from the remote host computer requests the cheque 370 to be returned, the transportation unit 104 is driven in the reverse direction to return the cheque 370 so that the customers or the bank clerks can receive the cheque 370. If the command asks for deposition of the cheque 370, the transportation unit 104 is driven in the forward direction to have the cheque 370 move forward.

At last, the cheque reaches the printing unit 116 where characters are printed on the cheque 370 for the purpose of endorsement. At the termination of the endorsement printing, the cheque 370 continues to move forward and eventually is collected and stored in the storage cassette 118.

This finishes all the steps for depositing a single leaf of cheque. These steps are repeatedly performed until a large number of cheque leaves are collected in the storage cassette 118 and taken out from the storage cassette 118 by the bank clerks.

In the embodiment illustrated and described above, the host computer is employed to verify the authenticity or the abnormality of the cheque, thus allowing the customers or the bank clerks to confirm the result of verification.

Alternatively, without resort to the host computer, the cheque-depositing module 100 may be embodied to verify the authenticity or the abnormality of the cheque by itself or by network reference and then to directly deposit or return the cheque with no confirmation of the customers or the bank clerks.

In the above-noted depositing process, the presence of plural cheque leaves is detected in a tripartite manner by means of the CIS unit 108, the MICR unit 110 and the plural cheque leaves detecting unit 112. This enhances accuracy and reliability of the detection.

As described in the foregoing, the present invention provides a number of beneficial effects, including accurate processing, increased productivity, reduced manpower and quick depositing. This helps to reduce the waiting time from the view point of customers and hence makes the customers feel convenient. In addition, the presence of plural cheque leaves can be detected in an accurate and reliable manner, thereby precluding the possibility that the cheque is deposited in plural numbers at one time. This improves the operational reliability of the ATM.

While the invention has been shown and described with respect to the preferred embodiment, it will be understood by those skilled in the art that various changes and modification may be made without departing from the spirit and scope of the invention as defined in the following claims.

What is claimed is:

1. An automated teller machine (ATM) capable of depositing a cheque, which comprises:

a cheque input slot through which the cheque is inserted on a leaf-by-leaf basis;

a transportation unit for transporting the cheque along a cheque moving path;

a CIS (Contact Image Sensor) unit for scanning the cheque to acquire image information;

a MICR (Magnetic Ink Character Recognition) unit for acquiring information on magnetic characters printed on the cheque;

a printing unit for printing endorsement characters on the cheque; and means for verifying the authenticity of the cheque based on the image information acquired by the CIS unit and the magnetic character information acquired by the MICR unit and for returning the cheque or allowing the cheque to be endorsed and stored, depending on the result of verification.

2. The ATM of claim 1, further comprising means for determining the presence of plural cheque leaves based on the image information provided from the CIS unit and the magnetic character information provided from the MICR unit.

3. The ATM of claim 2, wherein the image information includes information on the size of the cheque and the magnetic character information includes magnetic characters on the cheque.

4. The ATM of claim 1, further comprising:

a plural cheque leaves detecting unit for sensing the thickness of the check; and means for determining the presence of plural cheque leaves based on the thickness of the cheque.

5. The ATM of claim 4, wherein the plural cheque leaves detecting unit includes:

a rotating plate member provided on the cheque moving path and rotatable by a pushing force of the cheque at different angles corresponding to the thickness of the cheque, the rotating plate member having a plurality of slits formed at a predetermined interval; and a photo sensor for detecting the number of the slits which moves past the photo sensor as the rotating plate member is caused to rotate to thereby sense the thickness of the cheque.

6. An automated teller machine (ATM) capable of depositing a cheque, which comprises:

a cheque input slot through which a cheque is inserted on a leaf-by-leaf basis;

a transportation unit for transporting the cheque along a cheque moving path;

a CIS (Contact Image Sensor) unit for scanning the cheque to acquire image information;

a MICR (Magnetic Ink Character Recognition) unit for scanning the cheque to acquire magnetic information;

a plural cheque leaves detecting unit for sensing the thickness of the check; and means for determining the presence of plural cheque leaves using the image information, the magnetic character information and thickness information of the cheque;

a printing unit for printing endorsement characters on the cheque supplied from the plural cheque leaves detecting unit; and means for verifying the authenticity of the cheque based on the image information acquired by the CIS unit and the magnetic character information acquired by the MICR unit and for returning the cheque or allowing the cheque to be endorsed and stored, depending on the result of verification.

7. The ATM of claim 6, wherein the plural cheque leaves detecting unit includes:

a rotating plate member provided on the cheque moving path and rotatable by a pushing force of the cheque at different angles corresponding to the thickness of the cheque, the rotating plate member having a plurality of slits formed at a predetermined interval; and a photo sensor for detecting the number of the slits which moves past the photo sensor as the rotating plate member is caused to rotate to thereby sense the thickness of the cheque.

8. The ATM of claim 6, wherein the image information includes information on the size of the cheque and the magnetic character information includes magnetic characters of the cheque.

* * * * *